(12) United States Patent
Petillon (10) Patent No.: US 8,442,703 B2
(45) Date of Patent: May 14, 2013

(54) TURNING-STABILIZED ESTIMATION OF THE ATTITUDE ANGLES OF AN AIRCRAFT

(75) Inventor: Jean Paul Petillon, Miramas (FR)

(73) Assignee: Eurocopter, Marignane Cedex (FR)

( * ) Notice: Subject to any disclaimer, the term of this patent is extended or adjusted under 35 U.S.C. 154(b) by 186 days.

(21) Appl. No.: 13/013,926

(22) Filed: Jan. 26, 2011

(65) Prior Publication Data

US 2011/0190964 A1 Aug. 4, 2011

(30) Foreign Application Priority Data

Jan. 29, 2010 (FR) ...................................... 10 00380

(51) Int. Cl.
*G01C 23/00* (2006.01)
*G05D 1/00* (2006.01)
*G05D 3/00* (2006.01)
*G06F 7/00* (2006.01)
*G06F 17/00* (2006.01)

(52) U.S. Cl.
USPC ............................. 701/3; 342/357.3; 701/472

(58) Field of Classification Search ................ 701/3, 70, 701/72, 7, 466, 9, 301, 501; 235/472; 342/357.3
See application file for complete search history.

(56) References Cited

U.S. PATENT DOCUMENTS

| 6,493,631 B1 * | 12/2002 | Burns ........................... 701/472 |
| 6,580,389 B2 * | 6/2003 | Speyer et al. ............ 342/357.31 |
| 7,248,964 B2 * | 7/2007 | Bye ................................ 701/469 |
| 7,911,380 B2 * | 3/2011 | Petillon ...................... 342/357.3 |

FOREIGN PATENT DOCUMENTS

| EP | 0292339 | * 1/1991 |
| FR | 2614694 A1 | 11/1988 |
| FR | 2898196 A1 | 9/2007 |

* cited by examiner

*Primary Examiner* — Thomas Black
*Assistant Examiner* — Robert Payne
(74) *Attorney, Agent, or Firm* — Brooks Kushman P.C.

(57) ABSTRACT

The present invention relates to estimating the attitude angles of an aircraft (1). The estimated attitude angles are generated by a device (9) that performs algorithmic integration on inertial measurements indicative of an angular velocity and of a linear acceleration. Horizontal components (34-39) of desired corrections are obtained by a linear combination of two horizontal components (32-33), with cross coefficients between said horizontal axes being continuous variable over time and dependent on the estimated rate of turn. As a result, the estimated attitude angles are stable, and the biases of the gyros continue to be estimated, including during stages during which the aircraft (1) is turning.

14 Claims, 2 Drawing Sheets

TURNING-STABILIZED ESTIMATION OF THE ATTITUDE ANGLES OF AN AIRCRAFT

CROSS REFERENCE TO RELATED APPLICATIONS

This application claims the benefit of FR 10 00380 filed on Jan. 29, 2010, the disclosure of which is incorporated in its entirety by reference herein.

FIELD OF THE INVENTION

The general field of the present invention is that of piloting assistance for aircraft.

In particular, the present invention relates to measuring the attitudes of such an aircraft. Typically, it applies to attitude units. These measurements are used mainly for displays for use by the pilot of the aircraft (via a piloting flight display (PFD) or a flight display system (FDS)), and also by an autopilot system, or automatic flight control system (AFCS).

Among the attitude units concerned, the present invention is applicable for example to so-called attitude and heading reference systems (AHRS) or indeed to emergency instruments, e.g. known as integrated electronic standby instruments (IESIs).

BACKGROUND OF THE INVENTION

An example of an attitude and heading measurement system is described in document FR 2 614 694, which corresponds to European Patent No. 0292339.

Document FR 2 614 694 describes a unit with three detection assemblies respectively delivering gyro components, acceleration components, and magnetometer components in a three-axis system tied to the body of an aerodyne. On the basis of the gyro information, computation means generate a projection matrix for projecting these components into the local navigation three-axis system.

Other means enable the magnetometer components to be projected into the local navigation system using said matrix, and then to determine the heading error in the longitudinal-and-transverse axis system.

Furthermore, means generate corrections for the gyro measurements in the axis system tied to the aerodyne body on the basis of said attitude and heading errors.

In the attitude and heading measurement systems according to document FR 2 614 694, the estimated gyro bias, i.e. the difference between a true value of a gyro variable and the measured value, is frozen whenever the aircraft is turning, e.g. at more than 0.6 degrees per second (°/s).

The purpose of freezing the estimated gyro bias is to avoid instability that occurs in the attitude filter as a result of turning, and that would lead to divergence of the attitude estimates.

The drawback of that approach is that any variations in gyro measurement bias that take place after the bias has been frozen are no longer compensated. In general, this has little consequence when the gyros are of tactical grade, as applies to fiber optical gyros (FOGs) that present precision that is conventionally of the order of one degree per hour (1°/h).

In contrast, when the gyros of an attitude unit are of lower performance, that can lead to said attitude unit producing significant errors in its estimates of attitudes and of heading.

This applies for example when gyro bias is of the order of several tens of degrees per hour, as it is with vibrating gyros. Vibrating gyros in the form of micro-electromechanical systems (MEMSs) are presently available. Such MEMS gyros can be manufactured using methods that are close to those used for manufacturing integrated circuits, and are low in cost.

One approach to this problem provides for hybridizing data from a positioning system such as the global positioning system (GPS) or the Galileo positioning system, or the like, and data coming from an inertial measurement unit (IMU) in order to constitute an inertial navigation system (INS).

Document FR 2 898 196 describes such an approach, as does the document "Reconstitution de l'état d'un micro drone par fusion de données" [Reconstructing the state of a micro-drone by data merging] by Joan Solà Ortega, available at: http://homepages.laas.fr/jsola/JoanSola/objectes/a ltres/ DEA/RapportDEA.doc According to those documents, a global filter is proposed (attitudes/heading, speed, position/altitude). The attitude, heading, and vertical filters are not separable into sub-filters, which prevents them from being resolved, as is essential for proving that they have the stability required, e.g. for certification that is "safety critical". Furthermore, the three Euler angles (cf. infra) are handled in the complex form of a quaternion of variable Q and dimension four (4). Finally, the biases of the sensors, in particular of the gyros, are expressed in a body frame of reference, thereby complicating the formulation thereof.

Furthermore, it is presently not possible for an attitude unit to include gyros presenting estimated error or bias that is of the order of several tens of degrees per hour. A fortiori, this is completely impossible if it is desired to obtain safety-critical certification. Nevertheless, low-cost vibrating gyros exist in MEMS form. With present techniques, such MEMS gyros present biases that are too great for them to be included in an attitude unit.

SUMMARY OF THE INVENTION

By way of example, the invention seeks to solve those drawbacks. In particular, the invention seeks to:
 make it easier to incorporate MEMS gyros in an AHRS;
 continue estimating gyro bias while turning; and
 ensure that the attitude, heading, and vertical filters are separable into sub-filters, thereby ensuring simplicity, and thus making it possible to prove the system is stable, e.g. for certification.

The invention thus makes it possible to provide piloting assistance equipment for an aircraft that is both inexpensive and safety-critical.

To this end, in one aspect, the invention provides a method of estimating the attitude angles of an aircraft.

In this method:
 Said estimate of the attitude angles and an estimate of a heading angle and an estimate of a linear speed vector expressed relative to navigation axes are generated by algorithmic integration of measurements from an inertial measurement unit with strapdown components, said measurements being indicative of an angular velocity and of a linear acceleration of said aircraft.
 Said algorithmic integration also has inputs for correcting said inertial measurements, the inputs being expressed relative to navigation axes by two horizontal components and by one vertical component and serving to correct: angular acceleration; angular velocity; and linear acceleration.
 A linear speed difference expressed relative to navigation axes is formed by subtracting the estimated linear speed generated by said algorithmic integration from a measurement of the linear speed of the aircraft coming from a linear speed sensor and expressed likewise relative to navigation axes.

An estimate of the rate of turn of the aircraft is formed by estimation (projection and/or differentiation) from the measured angular velocity about a vertical navigation axis using a projection operator that is a function of said attitude angles.

Each of the two horizontal components of said angular acceleration, angular velocity, and linear acceleration corrections is a linear combination of the two horizontal components of said speed difference, namely of the component that is parallel to the correction and the other horizontal component that is not colinear with (usually perpendicular to) said correction; whereby cross coefficients are obtained between said horizontal axes.

Each of the coefficients of said linear combination is a continuous function of time and depends on said estimated rate of turn; such that the estimated attitude angles are stable, including while the aircraft is turning.

In an implementation, said linear combination coefficients are the terms of a matrix K(t) representing the solution to the following continuous time differential equation known as a "Riccati" equation:

$$\frac{dP}{dt} = FP + PF^T + Q - PH^T R^{-1} HP$$
$$K = PH^T R^{-1}$$

where: t is the time variable; P is the covariance matrix of state noise; Q is the power spectrum density matrix of errors affecting the inertial measurements; R is the power spectrum density matrix affecting the linear speed measurement; H is the matrix for projecting the state vector onto an observation subspace; and F is the variation matrix of the linear system describing the propagation dynamics of the horizontal correction components in said algorithmic integration:

$$\begin{pmatrix} \dot{\vec{\delta}} \\ \dot{\vec{i}} \\ \dot{\vec{v}} \end{pmatrix} = \begin{pmatrix} \Omega & 0 & 0 \\ 1 & 0 & 0 \\ 0 & G & 0 \end{pmatrix} \cdot \begin{pmatrix} \vec{\delta} \\ \vec{i} \\ \vec{v} \end{pmatrix} + \begin{pmatrix} \vec{\rho} \\ \vec{\omega} \\ \vec{\gamma} \end{pmatrix}, \text{ with } \begin{matrix} F(t) = \begin{pmatrix} \Omega & 0 & 0 \\ 1 & 0 & 0 \\ 0 & G & 0 \end{pmatrix} \\ H = (0 \ 0 \ 1) \end{matrix}$$

$$(\vec{v}) = (0 \ 0 \ 1) \cdot \begin{pmatrix} \vec{\delta} \\ \vec{i} \\ \vec{v} \end{pmatrix}$$

where:

$(\vec{\delta} \ \vec{\tau} \ \vec{v})^T$ is a state vector constituted by pairs of horizontal components:

i) of the bias affecting said measurement of angular velocity ($\vec{\delta}$);

ii) of the angles of inclination ($\vec{\tau}$) in a level plane defined by the attitude angles estimated by the algorithmic integration; and iii) of the bias affecting said estimate of speed ($\vec{v}$);

$(\vec{\rho} \ \vec{\omega} \ \vec{\gamma})^T$ is a control vector constituted by pairs of horizontal components of the inertial measurement corrections namely:

i) angular acceleration $\vec{\rho}$;

ii) angular velocity $\vec{\omega}$; and iii) linear acceleration $\vec{\gamma}$;

$$\cdot \Omega \begin{pmatrix} 0 & -\dot{\psi} \\ \dot{\psi} & 0 \end{pmatrix}$$

is a 2×2 matrix defined by said rate of turn $\dot{\Psi}$; and $$\cdot G = \begin{pmatrix} 0 & g \\ -g & 0 \end{pmatrix}$$

is a 2×2 matrix defined by the modulus g of the local acceleration due to gravity.

In an implementation, said Riccati equation is solved in a "discrete time" approximate form.

In practice, said linear speed measurement is taken from a sensor that expresses its measurement relative to axes tied to the aircraft body, the measurement being obtained by using said projection operator to project said body axes onto said navigation axes.

In various embodiments, said sensor comprises at least a Pitot tube anemometer and/or a Doppler radar sensor and/or a vector anemometer system computed by internal means (e.g. VIMI) or the like.

In another practical implementation, said linear speed measurement is taken directly from a sensor that expresses its measurement relative to the navigation axes, said sensor being a global positioning system (GPS or Galileo), or the like.

In an implementation of the method, vertical corrections are also performed for angular velocity and angular acceleration. These corrections are computed by a heading filter making use of measurements from a magnetometer secured to the aircraft.

In an implementation, a vertical correction is also performed for linear acceleration, said correction being computed by a "vertical" filter relying on measurements from a sensor measuring an altitude and/or a vertical speed of the aircraft; said sensor being a global positioning system (GPS, Galileo, or the like) and/or a pressure sensor, or the like.

In another aspect, the invention provides a device for estimating the attitude angles of an aircraft.

In one embodiment, the device comprises:

A virtual platform processing data from an inertial measurement unit having strapdown components, in order to generate estimates of the attitude angles and estimates of a heading angle and of a linear speed; said platform having means for algorithmic integration of inertial measurements indicative of an angular velocity and of a linear acceleration of said aircraft; the estimated linear speed being expressed by two horizontal components and one vertical component projected onto navigation axes.

Input ports to said virtual platform enabling it (i.e. the platform) to apply corrections expressed relative to navigation axes to the inertial measurements, said corrections consisting in terms for: angular acceleration applied via a (first) port; angular velocity applied via a (second) port; and linear acceleration applied via a (third) port.

Subtractor means connected to a linear speed sensor and arranged to provide a speed difference vector expressed relative to navigation axes, by subtracting the linear speed estimate generated by said virtual platform from a measurement of the speed of the aircraft from said sensor.

Projection means for forming an estimate of the rate of turn by projecting the measured angular velocity onto a vertical axis using a projection operator that is computed from the attitude angles.

Linear combination means arranged in such a manner that each of the two horizontal components of said angular acceleration, angular velocity, and linear acceleration corrections is a linear combination of two horizontal components of said speed difference, the component parallel to said correction and the component that is perpendicular to, i.e. not colinear with said correction; the coefficients of said linear combinations being continuous functions of time and being dependent on said rate of turn estimate.

In an embodiment of the device, it implements the above-mentioned method.

In an embodiment, the device forms part of an attitude unit of an emergency instrument (or the like), said angular correction input ports of the virtual platform receiving a zero contribution concerning the vertical axis.

In an embodiment, the device is also connected to a magnetometer secured to the aircraft and to a sensor of altitude or of vertical speed; this device may be an attitude and heading unit (an AHRS or the like) having heading and vertical filters.

For example, said correction input ports receive vertical correction terms relating to acceleration and to angular velocity from strapdown gyros of the device as a contribution from said heading filter, and a vertical correction for linear acceleration as a contribution from said vertical filter.

In another aspect, the invention provides an aircraft.

In an embodiment, the aircraft employs an attitude angle estimate obtained using the above-mentioned method.

In an embodiment, the aircraft includes an attitude unit forming a device as mentioned above.

In an embodiment, the inertial measurement unit includes at least one vibrating structure gyro of the MEMS type.

It will also be seen that the invention seeks to resolve the processing into sub-filters, that are proved to be independent, and that are sufficiently simple to enable stability to be proved mathematically. This makes it possible to obtain an attitude estimate in accordance with the invention that is functionally reliable, e.g. up to a safety-critical level.

It can be understood that by means of the invention, bias is tracked continuously, unlike in the prior art where tracking is interrupted during any turn that exceeds a certain rate of turn (e.g. 0.6°/s as in document FR 2 614 694).

It will also be understood that the invention preserves the simplicity of the attitude filter, which filter is not entangled with the heading filter or the vertical speed filter, thus making it possible to obtain certification at a safety-critical level.

BRIEF DESCRIPTION OF THE DRAWINGS

The invention and its advantages appear in greater detail in the following description of embodiments given by way of illustration with reference to the accompanying figures, in which:

FIGS. 3, 4, and 5 resolve the rotation in three dimensions (3D) for converting from said local navigation frame of reference to said body frame of reference into three individual rotations, each about a single axis in order to define Euler angles;

DETAILED DESCRIPTION OF THE PREFERRED EMBODIMENT

In FIGS. 1 to 6, overall numerical reference designates an aircraft. In FIGS. 2 to 5, the aircraft 1 is a helicopter, but this is not limiting.

Figure 1:
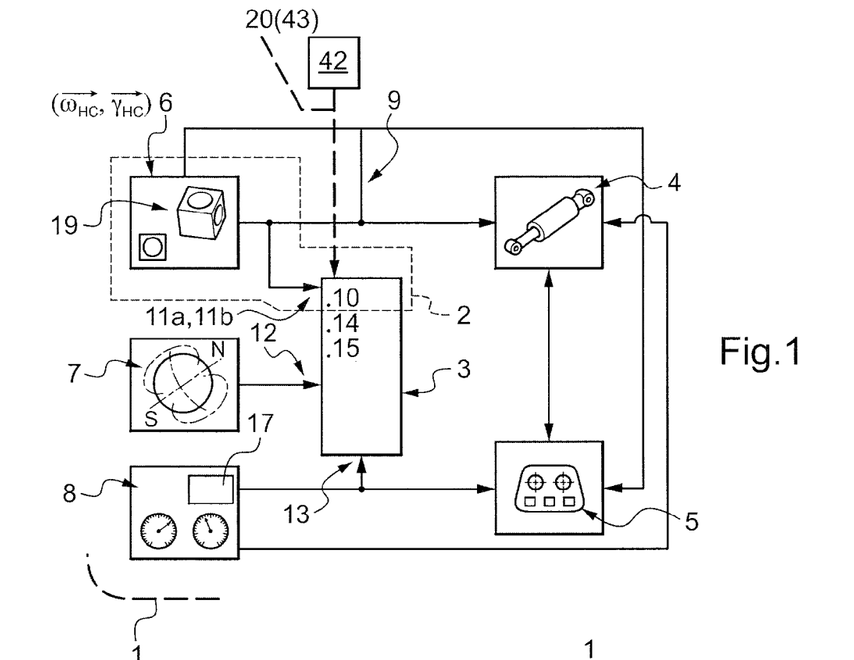
FIG. 1 is a diagrammatic view showing equipment on board an aircraft of the invention, including an attitude unit provided with a computed virtual platform suitable for providing information to an autopilot and to a display of the aircraft.

In FIG. 1, there can be seen various pieces of piloting assistance equipment on board an aircraft 1 in accordance with the invention. In particular, the aircraft 1 includes an attitude unit 2. By way of example, reference 2 designates an "AHRS" system and/or emergency instruments of the aircraft 1, such as an integrated electronic standby instrument (IESI). In general, in an aircraft 1, there are found to be both an AHRS type system and emergency instruments.

The unit 2 includes in particular a computed virtual platform 3.

The platform 3 performs computations to maintain an estimate of the directions of the navigation axes, this estimate suffering from three angle errors: two angles of inclination relative to the true level plane, and the azimuth angle defined relative to the direction of true magnetic north.

FIG. 1 shows an autopilot 4 together with a display 5 on board the aircraft 1. In FIG. 1, the unit 2 of the aircraft 1 receives as inputs signals that come from an inertial measurement unit (IMU) 6 that forms part of the attitude unit 2 in the example of FIG. 1, from a three-axis magnetometer 7, and from a sensor 8 providing air data measurements.

In this embodiment, the display 5 for the pilot of the aircraft 1 is a PFD or an FDS, and the autopilot is often referred to as an AFCS.

In an embodiment, the sensor 8 includes a Pitot tube anemometer. Other embodiments posses a Doppler radar sensor 8 or a vector anemometer system computed by internal means, e.g. VIMI.

Figure 2:
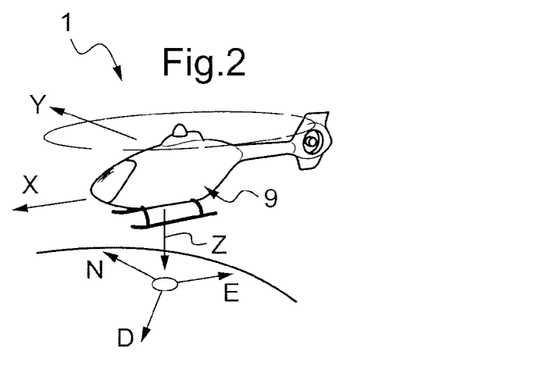
FIG. 2 is a diagrammatic perspective view of an aircraft in accordance with the invention in an arbitrary non-canonical orientation, associated with a body frame of reference forming three axes X, Y, Z; the figure also shows a local navigation frame of reference with axes forming a system N, E, D.
Figure 3:
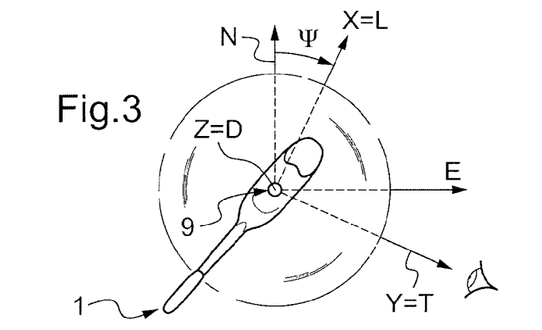
FIG. 3 is a diagrammatic plan view of the FIG. 2 aircraft, and shows this aircraft after it has turned relative to a canonical virtual position in which the X, Y, Z system coincides with the N, E, D system, through a heading angle about the vertical axis "D", defining a level (i.e. horizontal) frame of reference of axes forming the L, T, D system.
Figure 4:
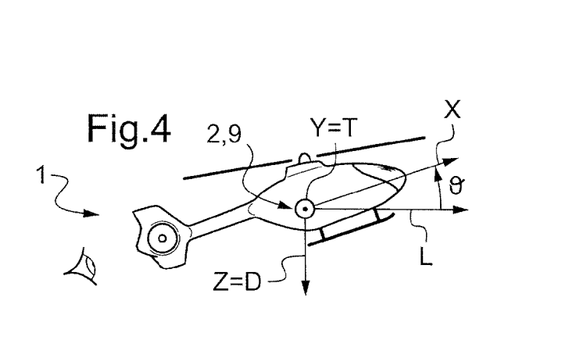
FIG. 4 is a side view similar to FIGS. 2 and 3, showing the aircraft after performing a virtual head-up or head-down pitching movement about a transverse axis "T"
Figure 5:
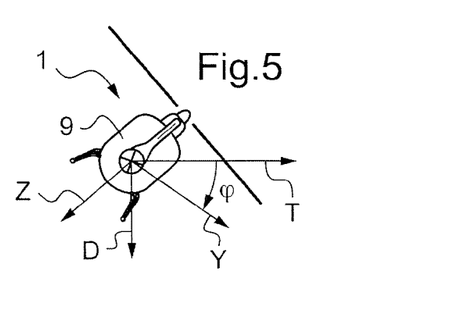
FIG. 5 is a view from behind similar to FIGS. 2 to 4 showing the aircraft reaching its real position after performing a roll movement through an angle about its own longitudinal axis "X"

It is also possible in the context of the invention to obtain a linear speed measurement directly from a sensor 8 that is expressed relative to the navigation axes N, E, and D (see FIG. 2). Typically, such a sensor 8 is a GPS or Galileo system.

From a hardware point of view, the invention can be seen as a device 9 for estimating attitude angles (θ, ω: see FIGS. 4 to 6) of the aircraft 1. In these figures, the device 9 is on board the aircraft 1.

As mentioned above, an embodiment of the device 9 includes a virtual platform 3. This virtual platform 3, also known as a strapdown algorithm (SDA) integrates inertial measurements from the unit 6 that performs inertial measurements of strapdown components.

The inertial measurements input to the virtual platform 3 are linear acceleration measurements reaching the virtual platform via its port 11a, and also angular velocity measurements in the body frame of reference reaching the virtual platform via its port 11b. The virtual platform outputs estimates for the roll, pitch, and heading angles (of the body) and a mean air speed (of the body) in the navigation frame of reference.

This platform 3, and in particular means 10 (FIG. 1) for algorithmic integration of inertial measurements indicative of the angular velocity and of the linear acceleration of the aircraft 1, thus serves to generate estimated attitude angles together with a heading angle and a linear speed.

The estimated linear speed is expressed by two horizontal components and by one vertical component, in projection onto the navigation axes N, E, and D.

The device 9 in accordance with the invention also possesses an input port 12 for acquiring measurements performed by said magnetometer 7, an input port 13 for acquiring said measurement of the linear speed of the aircraft, and ports 21, 22, and 23 (FIG. 6) that enable the platform 3 to apply corrections to the inertial measurements. These corrections are three-dimensional vectors, expressed relative to the navigation axes N, E, and D.

Figure 6:
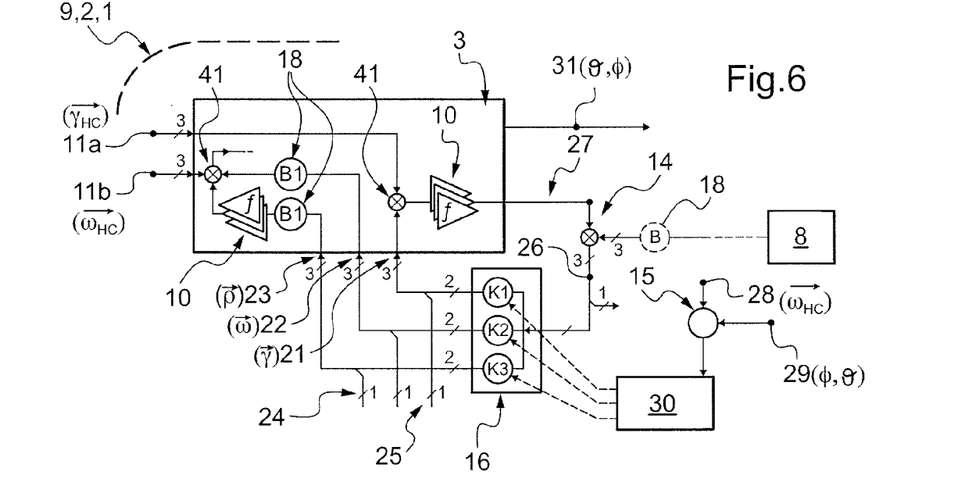
FIG. 6 is a diagram showing the data processing specific to an implementation of the invention in which a virtual platform integrates inertial measurements in order to compute estimated angles and speed, and in which a module computes gains that depend on the rate of turn of the aircraft.

In the embodiment of FIG. 6, it can be seen that the device 9 and in particular the virtual platform 3 includes subtractor means 14.

In FIG. 6, a measurement of the linear speed of the aircraft is supplied to the subtractor means 14 after projection from the body frame of reference to the navigation frame of reference N, E, D via a transition matrix B.

Within the platform 3, there can be seen a matrix $B^{-1}$ for performing the transition from the navigation frame of reference N, E, D to the body frame of reference X, Y, Z. Just like a matrix B for performing the transition from the body frame of reference to the navigation frame of reference N, E, D, the matrix $B^{-1}$ is computed as a function of the roll, pitch, and heading angles. It may also be computed by inverting the matrix B.

In order to acquire said measurement of the linear speed of the aircraft, said means 14 are connected via the matrix gain B to a linear speed sensor, such as the sensor referenced 8 in FIG. 1. The means 14 are arranged to form a speed difference, expressed relative to the navigation axes, by subtracting a value 27 (FIG. 6) for the estimated linear speed as generated by the virtual platform 3 from a measurement of the speed of the aircraft 1 as obtained from said sensor and expressed likewise relative to the navigation axes.

Still in the embodiment of FIG. 6, it can be seen that the device 9, and in particular the virtual platform 3, includes projection means 15. These projection means 15 serve to form an estimate (projection or differentiation) of the rate of turn by projecting the measured angular velocity onto the vertical axis D. This projection by the means 15 is performed by a projection operator "P" (FIG. 6) that is computed from the attitude angles.

It should be observed that this way of computing the rate of turn is not limiting. Thus, in another implementation of the invention, the rate of turn is formed by computing the time derivative of the heading angle, rather than by projecting the measured angular velocity.

Furthermore, an input port 28 of the projection means 15 receives an angular velocity value $\vec{\omega}_{HC}$, e.g. such as that also reaching the input port 11b of the platform 3. The operator of said projection is computed from two attitude angles (θ, φ) delivered to another input port 29 of said means 15.

Furthermore, in the embodiment of FIG. 6, the unit 2 includes linear combiner means 16. These linear combiner means 16 are arranged in such a manner that each of the two horizontal components (N and E) of the angular acceleration, angular velocity, and linear acceleration corrections is a linear combination of the two horizontal components of the speed difference.

In FIG. 6, reference 26 designates an output for the vertical component of the speed difference that is delivered to a vertical filter of the unit 2 and that is taken from the output of the subtractor means 14.

To summarize, with the device 9 of the invention, the unit 2 includes a virtual platform 3 that integrates inertial measurements from sensors strapped down to the body, for the purpose of computing output estimates, namely:

three angles, i.e. the roll, pitch, and heading angles (of the aircraft 1); and a linear speed vector (of the aircraft 1) in the navigation frame of reference.

A gain module of the means 16 responds to its inputs for north speed difference 32 and east speed difference 33 (FIG. 7) to compute the level components of the three correction vectors in three dimensions (3D) expressed in the navigation frame of reference (N, E, D).

These three correction vectors are for applying the following corrections to the virtual platform:

i) angular acceleration roll $\vec{\rho}$;

ii) angular velocity $\vec{\omega}$; and iii) linear acceleration $\vec{\gamma}$.

Finally, a stage for computing a speed difference vector subtracts the speed as estimated by the virtual platform 3 from a speed measured by a speed sensor (after projecting said speed measurement into the navigation frame of reference, should said speed sensor operate in another frame of reference).

Each of the north and east components of each of the three correction vectors (angular acceleration $\vec{\rho}$, angular velocity $\vec{\omega}$, and linear acceleration $\vec{\gamma}$) is computed as a linear combination of the north and east components of said speed difference vector.

In one implementation, the third components (vertical components) of the angular acceleration and angular velocity corrections are taken from the heading filter. In an implementation, the vertical third component of the linear acceleration correction is taken from the vertical filter.

Use is thus made of twelve coefficients (two speed differences multiplied by three state corrections multiplied by two axes (north and east) equals 12) in linear combinations. According to the invention, these twelve coefficients are continuous functions of time and depend on said vertical components of angular velocity or rate of turn obtained from the projection operator 15.

In the embodiment of FIG. 6, it can be seen that gains $K_1$, $K_2$, and $K_3$ are computed by computation means 30 having an input port receiving said rate of turn from the projection operator 15.

In certain implementations where the unit 2 is an integrated electronic standby instrument (IESI) that is not designed to deliver a heading indication or a vertical speed indication, the correction input ports 21, 22, 23 of the virtual platform 3 receive zero contribution concerning the vertical axis.

In an implementation, the unit 2 is an AHRS. Under such circumstances it is connected firstly to a magnetometer such as the three-axis magnetometer 7 of FIG. 1. The magnetometer is secured to the aircraft 1, as indeed is the unit 6. The unit 2 is also connected to an altitude or vertical speed sensor, represented diagrammatically at 17 in FIG. 1, where it forms a part of the sensor 8.

In this embodiment, the unit 2 has heading and vertical filters. The inputs ports 21-23 then receive vertical turns for acceleration correction and angular velocity correction as contributions from said heading filter, and a vertical correction for linear acceleration as a contribution from said vertical filter. Such a vertical filter that is dedicated to vertical linear movements is described in document FR 2 840 073.

In the embodiment of FIG. 1, a triad of gyros 19 are at least in part of the MEMS type. In other embodiments, this triad of gyros 19 also includes at least one FOG type gyro.

In an embodiment of the invention, the inertial measurement unit (IMU) 6 performs angular velocity and linear acceleration measurements (also known as "specific forces") in the form of three-dimensional vectors. In some embodiments, these measurements are provided by MEMS.

In some embodiments, the sensor 8 includes a receiver 42, e.g. of the GPS or analogous type. Under such circumstances, when a latitude value is available for the aircraft 1, e.g. from such a receiver 42, or indeed from a configuration file (reference 43 in FIG. 1), this latitude may be used by the virtual platform 3 to apply a terrestrial rotation correction to the gyros. The virtual platform 3 then possesses an input port 20 such as that shown in dashed lines in FIG. 1.

In implementations of the invention where vertical angular velocity and angular acceleration corrections are performed, these corrections are computed by the heading filter, which in turn makes use of measurements from a magnetometer 7, which magnetometer is secured to the aircraft 1, as shown in FIG. 1.

The unit 2 in accordance with the invention implements a method that is described below.

In a processing stage of the method in accordance with the invention, the above-mentioned estimates of the attitude angles, and also an estimate of the heading angle and an estimate of a linear velocity vector expressed in terms of navigation axes (N, E, D) are generated by the virtual platform 3 by algorithmic integration of measurements from the unit 6 for performing inertial measurements with strapdown components, said measurements being indicative of an angular velocity $\vec{\omega}_{HC}$ (acquired via an input port reference 1b in FIG. 6) and a linear acceleration $\vec{\gamma}_{HC}$ (acquired from an input port, reference 11a, in FIG. 6) of the aircraft 1.

In another processing stage, the algorithmic integration that is typically performed by the means 10 (FIG. 1) has correction inputs (e.g. references 21-23 in FIG. 6) for said inertial measurements expressed relative to two horizontal components (north and east) of navigation axes and a vertical component. From left to right in FIG. 6, the three inputs 23-21 are allocated to the angular acceleration correction $\vec{\rho}$; to the angular velocity correction $\vec{\omega}$; and to the linear acceleration correction $\vec{\gamma}$. In FIG. 6, two inputs referenced 24 receive vertical speed and angular acceleration corrections from a heading filter, and an input 25 receives the vertical linear acceleration correction from a vertical filter of the device 9.

In another processing stage, the subtractor means 14 determine a speed difference (e.g. reference 26 in FIG. 6) likewise expressed relative to navigation axes, by subtracting the linear speed estimate (e.g. reference 27, FIG. 6) generated by said algorithmic integration (platform 3) from a measured linear speed of the aircraft 1, such as that from the sensor 8. At the input from the subtractor means, the measured linear speed is expressed relative to navigation axes.

Another processing stage in accordance with an implementation of the invention involves the projection means 15 forming an estimate of the rate of turn of the aircraft 1. This estimated rate of turn is formed by projecting the measured angular velocity $\vec{\omega}_{HC}$ onto the vertical axis D by means of a projection operator that is a function of said attitude angles.

According to the invention, each of the two horizontal components of said angular acceleration $\vec{\rho}$, angular velocity $\vec{\omega}$, and linear acceleration $\vec{\gamma}$ corrections is a linear combination of the two horizontal components of the speed difference vector.

Figures 7, 8:
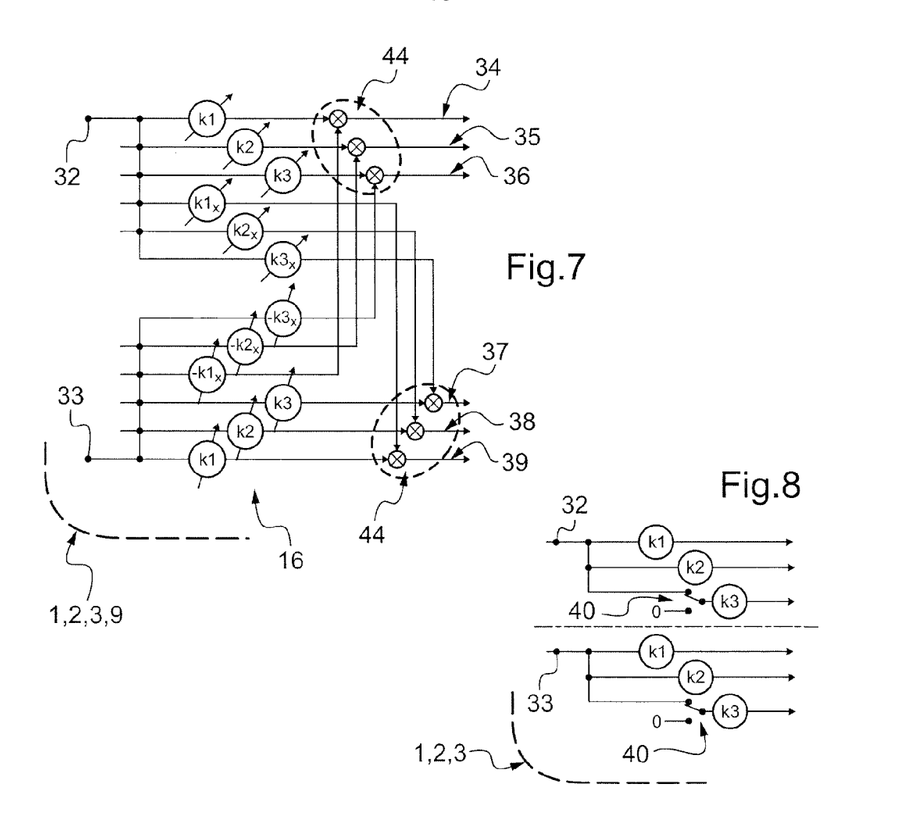
FIG. 7 is a diagram showing the structure of the gains (or linear combination coefficients) in accordance with the invention, and in particular: i) the symmetry of the direct gains on the horizontal speed difference components and the antisymmetry (i.e. opposite signs) of the gains referred to as "cross" gains; and ii) the way said direct and cross gains vary over time.
FIG. 8 is a diagram showing the prior art having only gains that are direct and constant.

This gives rise to implementing direct gains referenced "$k_1$, $k_2$, $k_3$" as in the prior art, and also cross gains between said horizontal axes that are characteristic of the invention and that are designated "$-k_{1x}$, $-k_{2x}$, $-k_{3x}$" and "$k_{1x}$, $k_{2x}$, $k_{3x}$" in FIG. 7.

Each of these coefficients, or gains, of said linear combination is a continuous function of time (it is sometimes also said that the function is continuously variable over time) and depends on said estimated rate of turn. As a result, the estimated attitude angles are stable, even during prolonged stages of the aircraft 1 turning. These estimated attitude angles are produced at an output 31 of the platform 3, see FIG. 6, as outputs from the virtual platform 3.

In an implementation, said linear combination coefficients are the terms of a matrix K(t) representing the solution to the following continuous time differential equation known as a "Riccati" equation:

$$\frac{dP}{dt} = FP + PF^T + Q - PH^T R^{-1} HP$$

$$K = PH^T R^{-1}$$

In this Riccati differential equation:
t is the time variable;
P is the covariance matrix of state noise;
Q is the power spectrum density (PSD) matrix of errors affecting the inertial measurements;
R is the power spectrum density matrix affecting the linear speed measurement;
H is the matrix for projecting the state vector onto an observation subspace; and F is the variation matrix of the linear system describing the propagation dynamics of the horizontal correction components in said algorithmic integration performed by the platform 3.

Below, a dot above a symbol representing a vector designates the time derivative of that vector.

According to the invention, said propagation dynamics of errors in the algorithmic integration is described by the following state formulation:

$$\begin{pmatrix} \dot{\vec{\delta}} \\ \dot{\vec{i}} \\ \dot{\vec{v}} \end{pmatrix} = \begin{pmatrix} \Omega & 0 & 0 \\ 1 & 0 & 0 \\ 0 & G & 0 \end{pmatrix} \cdot \begin{pmatrix} \vec{\delta} \\ \vec{i} \\ \vec{v} \end{pmatrix} + \begin{pmatrix} \vec{\rho} \\ \vec{\omega} \\ \vec{\gamma} \end{pmatrix}, \text{ with } F(t) = \begin{pmatrix} \Omega & 0 & 0 \\ 1 & 0 & 0 \\ 0 & G & 0 \end{pmatrix}$$

$$(\vec{v}) = (0 \ 0 \ 1) \cdot \begin{pmatrix} \vec{\delta} \\ \vec{i} \\ \vec{v} \end{pmatrix} \quad H = (0 \ 0 \ 1)$$

where:

$(\vec{\delta} \ \vec{\tau} \ \vec{v})^T$ is a state vector constituted by pairs of horizontal components:
  i) of the bias affecting said measurement of angular velocity ($\vec{\delta}$);
  ii) of the two angles of inclination ($\vec{\tau}$) of the virtual platform 3 relative to a level plane in the true navigation frame of reference; and
  iii) of the bias affecting said estimate of speed ($\vec{v}$);

$(\vec{\rho} \ \vec{\omega} \ \vec{\gamma})^T$ is a control vector constituted by pairs of horizontal components of the inertial measurement corrections (angular acceleration $\vec{\rho}$, angular velocity $\vec{\omega}$, and linear acceleration $\vec{\gamma}$);

$$\cdot \Omega \begin{pmatrix} 0 & -\dot{\psi} \\ \dot{\psi} & 0 \end{pmatrix}$$

is a 2×2 matrix defined by said rate of turn $\dot{\Psi}$; and $$\cdot G = \begin{pmatrix} 0 & g \\ -g & 0 \end{pmatrix}$$

is a 2×2 matrix defined by the modulus $\underline{g}$ of the local acceleration due to gravity.

In an implementation of the method of the invention, said Riccati equation is solved in a "discrete time" approximate form.

Attention is given to FIGS. 7 and 8 in order to better illustrate the advantages of the invention.

FIG. 8 shows gains $k_1$, $k_2$, and $k_3$ that are constant, where the tracking of gyro bias is conventionally interrupted by means 40 beyond a selected rate of turn. The chain-dotted horizontal line shows clearly that the north and east axes are independent, or in other words that there is no cross-coupling between said axes.

In contrast, FIG. 7 relates to an implementation of the invention. On the left of this figure there can be seen the inputs 32 and 33 for the north and east components respectively of the speed difference.

As outputs, on the right, there can be seen in particular from top to bottom: a north component 34 for the linear acceleration $\vec{\gamma}$ correction; an east component 35 for the angular velocity $\vec{\omega}$ correction; an east component 36 for the angular acceleration $\vec{\rho}$ correction; and symmetrically: a north component 37 for the angular velocity $\vec{\omega}$ correction; a north component 38 for the angular acceleration $\vec{\rho}$ correction; and finally an east component 39 for the linear acceleration $\vec{\gamma}$ correction.

FIG. 7 shows the difference relative to the description of FIG. 8. There can also be seen:
  the symmetry of the direct gains (the same "direct" gains $k_1$, $k_2$, and $k_3$ are applied on the north and east components of the velocity difference); and
  the antisymmetry of the "cross" gains (there are opposite gains: $k_{1x}$, $k_{2x}$, and $k_{3x}$ on one side and $-k_{1x}$, $-k_{2x}$, $-k_{3x}$ on the other side for the north and east components of the speed difference.

It can be understood that the attitude angles as estimated by the invention are generated by algorithmic integration of inertial measurements indicative of the angular velocity and the linear acceleration of said aircraft 1.

A speed difference and a rate of turn are obtained. Desired correction horizontal components are obtained by linear combinations of the horizontal component that is parallel to said correction and the other horizontal component of said speed difference that is perpendicular to said correction, i.e. that is non-colinear therewith.

FIG. 6 shows means 30 for computing the gains $$K_1 = \begin{pmatrix} k_1 & -k_{1\times} \\ k_{1\times} & k_1 \end{pmatrix}, K_2 = \begin{pmatrix} k_2 & -k_{2\times} \\ k_{2\times} & k_2 \end{pmatrix} \text{ and } K_3 = \begin{pmatrix} k_3 & -k_{3\times} \\ k_{3\times} & k_3 \end{pmatrix}$$

These computation means 30 generate coefficients, or gains, that are continuously variable over time and that depend on said estimated rate of turn, with some of them being crossed between said horizontal axes.

In one implementation, these computation means 30 are constituted by a Riccati equation solver.

In FIG. 6, it can be seen that the projection operators are referenced 18 (matrix $B^{-1}$ for projecting the navigation frame of reference onto the body frame of reference downstream from the inputs 22 and 23, and matrix B for projecting from the body frame of reference to the navigation frame of reference upstream from the means 14). Reference 41 in FIG. 6, and reference 44 in FIG. 7, designate summing means of the invention.

It can be seen that the invention sets out to isolate the attitude filter, given that it is possible to prove mathematically that the attitude filter is independent from the heading and vertical filters. The simplicity that results from having an isolated attitude filter makes it possible to prove mathematically that it is unconditionally stable.

The invention thus enables attitude angle estimates to be stable while the aircraft is turning, while simultaneously preserving an estimate of the biases of the gyros during such turning stages.

Naturally, the present invention may be subjected to numerous variants. It will readily be understood that it is not conceivable to list exhaustively all possible implementations. It is naturally possible to replace any of the means described by equivalent means without going beyond the ambit of the present invention.

What is claimed is:

1. A method of estimating the attitude angles ($\theta$, $\phi$) of an aircraft, the estimating being a computed data processing operated by a computed attitude unit onboard the aircraft, wherein:

the computed attitude unit generating said estimate of the attitude angles ($\theta$, $\phi$) and an estimate of a heading angle ($\Psi$) and an estimate of a linear speed vector ($\vec{v}$) expressed relative to navigation axes (N, E, D) by algorithmic integration of measurements from an inertial measurement unit with strapdown components, said inertial measurements being indicative of an angular velocity ($\vec{\omega}$) and of a linear acceleration ($\vec{\gamma}$) of said aircraft;

characterized in that at least one of the strapdown components in the inertial measurement unit is a vibrating structure gyro that provides at least some of the inertial measurements for the algorithmic integration, and said algorithmic integration also having inputs for correcting said inertial measurements, the inputs being expressed relative to navigation axes (N, E, D) by two horizontal components and by one vertical component and serving to correct:

angular acceleration ($\vec{\rho}$);

angular velocity ($\vec{\omega}$); and linear acceleration ($\vec{\gamma}$);

the computed attitude unit forming a linear speed difference expressed relative to navigation axes (N, E, D) by subtracting the estimated linear speed vector ($\vec{v}$) expressed relative to navigation axes (N, E, D), generated by said algorithmic integration, from a measurement of the linear speed of the aircraft coming from a linear speed sensor and expressed relative to navigation axes (N, E, D);

the computed attitude unit forming an estimate of the rate of turn of the aircraft by estimation from the measured angular velocity about a vertical navigation axis using a projection operator that is a function of said attitude angles ($\theta$, $\phi$);

each of the two horizontal components of said angular acceleration ($\vec{\rho}$), angular velocity ($\vec{\omega}$), and linear acceleration ($\vec{\gamma}$) corrections is a linear combination of the two horizontal components of said linear speed difference, wherein the two horizontal components are the horizontal component which is parallel to the corrections and the other horizontal component which is not colinear with said corrections; whereby cross coefficients are obtained between said horizontal axes; and each of the coefficients of said linear combination is a continuous function of time and depends on said estimated rate of turn such that an attitude filtering is independent from a heading filtering and a vertical filtering allowing the estimated attitude angles to be stable, including while the aircraft is turning.

2. The method according to claim 1, wherein said linear combination coefficients are the terms of a matrix K(t) representing the solution to the following continuous time differential equation known as a "Riccati" equation:

$$\frac{dP}{dt} = FP + PF^T + Q - PH^T R^{-1} HP$$

$$K = PH^T R^{-1}$$

where: t is the time variable; P is the covariance matrix of state noise; Q is the power spectrum density matrix of errors affecting the inertial measurements; R is the power spectrum density matrix affecting the linear speed measurement; H is the matrix for projecting the state vector onto an observation subspace; and F is the variation matrix of the linear system describing the propagation dynamics of the horizontal correction components in said algorithmic integration:

$$\begin{pmatrix} \vec{\delta} \\ \vec{i} \\ \vec{v} \end{pmatrix} = \begin{pmatrix} \Omega & 0 & 0 \\ 1 & 0 & 0 \\ 0 & G & 0 \end{pmatrix} \cdot \begin{pmatrix} \vec{\delta} \\ \vec{i} \\ \vec{v} \end{pmatrix} + \begin{pmatrix} \vec{\rho} \\ \vec{\omega} \\ \vec{\gamma} \end{pmatrix}$$

$$(\vec{v}) = (0\ 0\ 1) \cdot \begin{pmatrix} \vec{\delta} \\ \vec{i} \\ \vec{v} \end{pmatrix} \quad F(t) = \begin{pmatrix} \Omega & 0 & 0 \\ 1 & 0 & 0 \\ 0 & G & 0 \end{pmatrix}$$

$$H = (0\ 0\ 1)$$

where:

$(\vec{\delta}\ \vec{\tau}\ \vec{v})^T$ is s a state vector constituted by pairs of horizontal components: i) of the bias affecting said measurement of angular velocity ($\vec{\delta}$); ii) of the two angles of inclination ($\vec{\tau}$) of a virtual platform of the computed attitude unit relative to a level plane in the true navigation frame of reference; and iii) of the bias affecting said estimate of speed ($\vec{v}$)

$(\vec{\rho}\ \vec{\omega}\ \vec{\gamma})^T$ is a control vector constituted by pairs of horizontal components of the inertial measurement corrections: i) angular acceleration ($\vec{\rho}$); ii) angular velocity ($\vec{\omega}$); and iii) linear acceleration ($\vec{\gamma}$);

$$\Omega \begin{pmatrix} 0 & -\dot{\psi} \\ \dot{\psi} & 0 \end{pmatrix}$$

is a 2×2 matrix defined by said rate of turn $\dot{\Psi}$; and $$G = \begin{pmatrix} 0 & g \\ -g & 0 \end{pmatrix}$$

is a 2×2 matrix defined by the modulus g of the local acceleration due to gravity.

3. The method according to claim 1, wherein said linear speed measurement comes from a linear speed sensor that expresses its measurement relative to axes tied to the body of the aircraft, this measurement being obtained by using said projection operator to project said body axes of the aircraft onto said navigation axes (N, E, D); said linear speed sensor including at least one Pitot tube anemometer and/or a Doppler radar sensor and/or a vector anemometer system computed by internal means.

4. The method according to claim 1, wherein said linear speed measurement is taken directly from a linear speed sensor that expresses its measurement relative to the navigation axes (N, E, D), said linear speed sensor being a global positioning system.

5. The method according to claim 1, wherein vertical corrections are also performed for angular velocity ($\vec{\omega}$) and angular acceleration ($\vec{\rho}$); said vertical corrections being computed by a heading filter making use of measurements from a magnetometer secured to the aircraft.

6. The method according to claim 1, wherein a vertical correction is also performed for linear acceleration ($\vec{\gamma}$), said vertical correction being computed by a "vertical" filter relying on measurements from a sensor measuring an altitude and/or a vertical speed of the aircraft; said sensor being a global positioning system and/or a pressure sensor.

7. A device for estimating the attitude angles ($\theta$, $\phi$) of an aircraft, wherein the device comprises:
- a virtual platform processing data from an inertial measurement unit having strapdown components, in order to generate estimates of the attitude angles ($\theta$, $\phi$) and estimates of a heading angle and of a linear speed; said platform having means for algorithmic integration of inertial measurements indicative of an angular velocity and of a linear acceleration of said aircraft; the estimated linear speed being expressed by two horizontal components and one vertical component projected onto navigation axes (N, E, D);
- characterized in that at least one of the strapdown components in the inertial measurement unit is a vibrating structure gyro that provides at least some of the inertial measurements for the algorithmic integration, and
- input ports to said virtual platform enabling said virtual platform to apply corrections expressed relative to navigation axes (N, E, D) to the inertial measurements, said corrections consisting in terms for:
  - angular acceleration ($\vec{\rho}$) applied via one of the input ports;
  - angular velocity ($\vec{\omega}$) applied via one of the input ports; and
  - linear acceleration ($\vec{\gamma}$) applied via one of the input ports;
- subtractor means connected to a linear speed sensor and arranged to provide a speed difference vector expressed relative to navigation axes (N, E, D), by subtracting the linear speed estimate generated by said virtual platform from a measurement of the speed of the aircraft from said linear speed sensor;
- projection means for forming an estimate of the rate of turn by projecting the measured angular velocity onto a vertical axis using a projection operator that is computed from the attitude angles ($\theta$, $\phi$); and
- linear combination means arranged in such a manner that each of the two horizontal components of said angular acceleration, angular velocity, and linear acceleration corrections is a linear combination of two horizontal components of said speed difference, wherein the two horizontal components are the horizontal component which is parallel to said corrections and the horizontal component which is not colinear with said corrections; coefficients of said linear combinations being continuous functions of time and being dependent on said rate of turn estimate.

8. The device according to claim 7, wherein the vibrating structure gyro is of the MEMS type.

9. The device according to claim 7, wherein the device forms part of an attitude unit of an emergency instrument, said correction input ports of the virtual platform receiving a zero contribution concerning the vertical axis.

10. The device according to claim 7, that is also connected to a magnetometer secured to the aircraft and to an altitude or vertical velocity sensor; the device forming part of an attitude unit forming a system for measuring two attitude angles and the heading angle, having heading and vertical filters; said correction input ports receiving vertical terms via the input for correcting angular acceleration ($\vec{\rho}$) and via input concerning angular velocity ($\vec{\omega}$) as a contribution from said heading filter, and via input a vertical correction concerning linear acceleration ($\vec{\gamma}$) as a contribution from said vertical filter.

11. An aircraft comprising:
- an attitude unit forming part of a device for estimating the attitude angles ($\theta$, $\phi$) of an aircraft, wherein the device includes:
- a virtual platform processing data from an inertial measurement unit having strapdown components, in order to generate estimates of the attitude angles ($\theta$, $\phi$) and estimates of a heading angle and of a linear speed; said platform having means for algorithmic integration of inertial measurements indicative of an angular velocity and of a linear acceleration of said aircraft; the estimated linear speed being expressed by two horizontal components and one vertical component projected onto navigation axes (N, E, D);
- characterized in that at least one of the strapdown components in the inertial measurement unit is a vibrating structure gyro that provides at least some of the inertial measurements for the algorithmic integration, and
- input ports to said virtual platform enabling said virtual platform to apply corrections expressed relative to navigation axes (N, E, D) to the inertial measurements, said corrections consisting in terms for:
  - angular acceleration ($\vec{\rho}$) applied via one of the input ports;
  - angular velocity ($\vec{\omega}$) applied via one of the input ports; and
  - linear acceleration ($\vec{\gamma}$) applied via one of the input ports;
- subtractor means connected to a linear speed sensor and arranged to provide a speed difference vector expressed relative to navigation axes (N, E, D), by subtracting the linear speed estimate generated by said virtual platform from a measurement of the speed of the aircraft from said linear speed sensor;
- projection means for forming an estimate of the rate of turn by projecting the measured angular velocity onto a vertical axis using a projection operator that is computed from the attitude angles ($\theta$, $\phi$); and
- linear combination means arranged in such a manner that each of the two horizontal components of said angular acceleration, angular velocity, and linear acceleration corrections is a linear combination of two horizontal components of said speed difference, wherein the two horizontal components are the horizontal component which is parallel to said corrections and the horizontal component which is not colinear with said corrections; coefficients of said linear combinations being continuous functions of time and being dependent on said rate of turn estimate.

12. The An aircraft according to claim 11, wherein the inertial measurement unit includes a fiber optical gyro and a MEMS type vibrating structure gyro.

13. The method according to claim 2, wherein said Riccati equation is solved in a "discrete time" approximate form.

14. The device according to claim 7, wherein the vibrating structure gyro is of the fiber optical gyro (FOG) type.

* * * * *